Sept. 28, 1965   L. S. SULLIVAN, JR   3,208,779
BALL JOINT DIRT SEAL VALVE
Filed Oct. 22, 1962

INVENTOR.
Leo S. Sullivan, Jr.
BY
Albert T. Reuther
His Attorney

United States Patent Office 3,208,779
Patented Sept. 28, 1965

3,208,779
BALL JOINT DIRT SEAL VALVE
Leo S. Sullivan, Jr., Dayton, Ohio, assignor to General Motors Corporation, Detroit, Mich., a corporation of Delaware
Filed Oct. 22, 1962, Ser. No. 232,159
6 Claims. (Cl. 287—87)

This invention relates to lubricant passage and sealing, and more particularly, to dirt-seal valve means installed on a ball joint assembly.

An object of this invention is to provide a new and improved dirt-seal valve means that facilitates passage of lubricant during injection thereof into a ball joint assembly, yet maintains an efficient peripheral seal along an edge thereof.

Another object of this invention is to provide a ball joint assembly having complementary socket and ball portions from which stud means project to be relatively movable, though attached to a structural member such as a vehicle steering knuckle against which an outer peripheral edge of an annular plastic valve portion makes a static seal displaceable to permit passage of lubricant under pressure while a dirt-shielding boot member extends from the socket portion and includes an annular end which turns on a resiliently engaged outer surface of the plastic valve portion on a location radially outwardly thereof.

A further object of this invention is to provide in combination a dirt-shielding boot member having an annular end portion that resiliently engages and is biased against an outer surface of a plastic valve portion having a general L-shaped cross section and a plurality of L-shaped inner recesses that terminate radially inwardly of an outer peripheral sealing edge of the plastic valve portion which is press fitted to a stud means projecting from a ball and socket assembly, the L-shaped inner recesses providing axial and radially outer passage for lubricant under pressure to overcome static engagement of the peripheral edge against a structural stud-mounting member.

Another object of this invention is to provide for a ball joint stud and socket assembly with lubricant filling and a dirt-shielding boot member, an improvement which comprises a corrosion-resistant plastic valve means having a generally L-shaped cross section including an annular axially extending body portion snugly fitted over an outer periphery of the ball joint stud as well as including an upwardly extending flange portion integral with the body portion to be jointly engaged by a reduced diameter annular end of the dirt-shielding boot member movable as to each other, the ball joint stud being secured to a structural support against which an outer periphery of the flange portion of the plastic valve means normally makes a static seal though lubricant injected under pressure can temporarily interrupt this seal while the reduced diameter end of the dirt-shielding boot member engages the corrosion-resistant plastic valve means having a plurality of inner L-shaped recesses therein for limited lubricant passage.

Further objects and advantages of the present invention will be apparent from the following description, reference being had to the accompanying drawings wherein a preferred embodiment of the present invention is clearly shown.

Figures 1, 2, 3, 4, 5, 6:
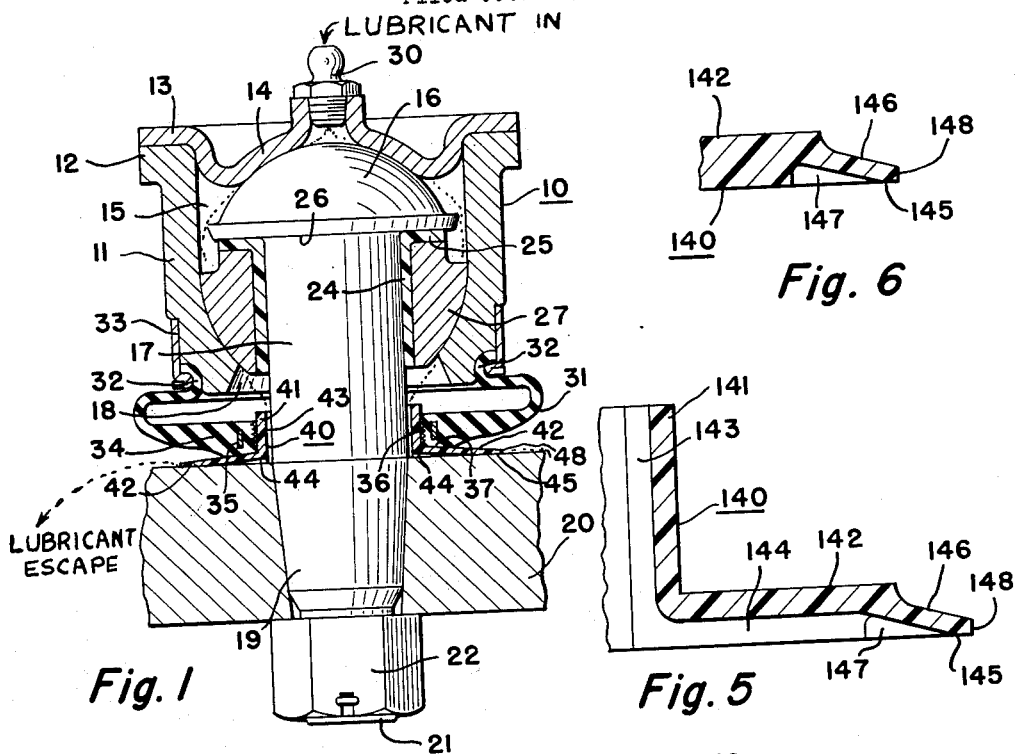
FIGURE 1 illustrates a cross-sectional view of ball joint stud and socket assembly provided with a dirt-seal valve means in accordance with the present invention.
FIGURE 2 is an enlarged plan view of a valve portion of the assembly of FIGURE 1
FIGURE 3 is a cross-sectional view taken along line 3—3 in FIGURE 2.

FIGURE 4 is another plan view of a modified valve portion and FIGURES 5 and 6 are cross-sectional views taken along lines 5—5 and 6—6 therein, respectively.

Increased use of extended lubrication schedules recommended by vehicle manufacturers results in need for thorough lubrication and preventive maintenance when necessary. Application of lubricants under pressure to fittings of vehicle suspension components can be facilitated by provision of dirt-seal valve means in accordance with the present invention. When supplying lubricant under pressure to a fitting, it is usual for an ample supply of new lubricant to be added resulting in a displacement of used and dirty lubricant previously in such a suspension component. However, quite often it is difficult to effect displacement of such used and dirty lubricant and such dispersal thereof can hinder injection of new lubricant under pressure. Accordingly, a dirt-seal valve means shown installed on a ball joint assembly generally indicated by numeral 10 in FIGURE 1 will improve passage of lubricant during injection into the ball joint assembly though maintaining proper protection against dust and dirt and providing an efficient peripheral seal.

The ball joint assembly 10 illustrated in FIGURE 1 includes a main body or socket portion 11 having an integral flange end 12 to which an outer periphery 13 of a metal cover portion 14 is joined. The annular outer end 13 of the cover portion 14 can be securely welded to the flange end 12 of the socket so as to define a space or inner cavity 15. The cover 14 can have a curved or arcuate intermediate portion engageable by a curved head 16 carried integrally by a stud 17 which projects through an opening 18 in a lower part of the socket or body portion 11. This stud 17 extends axially through the opening 18 and is shiftable or movable relative to the opening 18 in the socket 11 subject to securing of a tapered portion 19 of the stud into engagement with a structural member indicated by numeral 20. This structural member can be a vehicle steering knuckle and the like and there is a threaded end 21 of the stud onto which a suitable bolt or nut 22 can be threaded for holding the stud 17 including the tapered portion 19 thereof securely in engagement with the structural member 20 having an aperture therethrough.

The ball joint assembly can further include a sleeve-like liner or inner bearing member which includes a main axial portion 24 fitted around the stud 17 as well as an integral outwardly extending flange 25 which abuts against a shoulder 26 formed on one side of the curved head 16. This liner or member 24–25 can be made of a low friction plastic bearing material such as "Delrin" acetal resin or plastic material that is a highly crystalline, stable form of polymerized formaldehyde. Such acetal resin in this sleeve-like bearing member 24–25 assures high dimensional stability, tensile and flexural strength, resilience and toughness under a wide range of service conditions including temperature, humidity, solvents and stress. Such a "Delrin" sleeve-like liner or bearing member 24–25 provides for easier turning between the ball-stud and socket in a ball joint assembly which further includes an annular sintered metal bearing portion 27 engaging a curved inner periphery of the socket body portion 11. Metal such as iron can be used for the sintered metal bearing portion 27. Reference can be made to a copending patent application S.N. 42,909—Baker, filed, July 14, 1960 and belonging to the assignee of the present invention wherein a differing bearing structure is disclosed with a head and stud means similar to that shown in FIGURE 1. It is to be understood that the specific arrangement of the head and stud with such a bearing means can be varied though a lubricating fitting 30 can be secured to a central part of the cover portion 14 in a well-known manner.

The ball joint assembly 10 further includes a dirt-shielding boot 31 of elastomeric or resinous plastic material having a relatively larger end portion 32 held against the body or socket portion 11 by a metal snap ring 33 or other suitable fastening means such as a bracket or clip. The boot member 31 extends in a bellows-like configuration from the socket portion 11 and includes an integral annular end 34 which can have a reinforcing ring 35 embedded therein located radially outwardly from a serrated inner peripheral surface 36 which can include a plurality of concentric rings extending radially inwardly as plural sealing lips in a location adjacent to a substantially conically tapered surface 37.

A dirt-seal valve means generally indicated by numeral 40 is shown in combination with the foregoing structure and includes an annular axially extending body portion 41 as well as an outwardly extending, conically tapered flange portion 42. Views of FIGURES 2 and 3 provide an enlarged detailed showing of the dirt-seal valve means 40 which is installed in the assembly of FIGURE 1. As can be seen in views of FIGURES 1 and 3, the plastic valve means 40 has a generally L-shaped cross section as well as a plurality of L-shaped inner recesses having an axial portion 43 as well as a radial portion 44. The radial portion of each recess terminates inwardly of an outer peripheral sealing edge 45 of the plastic valve portion which has the axial body thereof indicated by numeral 41 press fitted to an outer periphery of the stud means 17 as can be seen in FIGURE 1. The peripheral sealing edge 45 normally has static sealing engagement against one side of the structural member 20 such as a vehicle steering knuckle. There is resilient biasing engagement of the reduced diameter annular end 34 against an outer periphery of the axial body portion 41 as well as outward flange 42 of the dirt-seal valve means 40 as can be seen in FIGURE 1. The boot member including the reduced diameter end 34 can turn or move relative to the static valve means 40. The annular plastic valve means 40 can be made of a low friction resinous material such as "Delrin" acetal resin, "nylon" polyamide material, "Teflon" polytetrafluoroethylene and the like into which the L-shaped recesses or grooves 43–44 can be molded or machined so as to permit passing of lubricant such as grease through the fitting 30 into a hermetically sealed cavity 15 of the ball joint assembly subject to displacement for escape of used lubricant during pressure ejection of new lubricant. This escape or displacement of used lubricant occurs by way of the axial passages 43 and radially outwardly communicating extensions 44 thereof subject to temporary displacement of the sealing edge 45 normally in peripheral engagement with one side of the structural member 20. Under resilient urging of the reduced diameter annular end 34 having a tapered conical surface 37 engaging the flange 42 of the valve means 40 in a location substantially in alignment with the reinforcing ring 35 there is maintained a static seal on the structural member or steering knuckle. The seal valve means 40 provides a corrosion-resistant plastic surface engageable by the reduced diameter annular end 34 of the boot member 31 thereby increasing useful duration and effectiveness of the seal having the L-shaped recesses or grooves 43–44 therein as a means for passing lubricant such as grease through the hermetically sealed ball joint and seal assembly without downgrading effectiveness of the seal. The outer peripheral edge 45 of the flange portion 42 is sufficiently flexible to permit temporary displacement thereof to pass lubricant under pressure yet to return to static sealing engagement against a side or surface of the structural member 20. The reduced diameter annular end 34 including the serrated surface 36 thereof can turn easily on the outer surface of the plastic valve means particularly along the axial body portion 41 thereof while the conical tapered surface 37 of the end 34 having the reinforcing ring 36 therein engages the outwardly extending flange portion 42 of the plastic valve means. The radially outwardly extending portions 44 of the recesses or grooves permitting passage of lubricant terminate short of an outer edge 48 of the seal means.

A modified dirt seal valve means generally indicated by numeral 140 is shown in FIGURE 4 and includes an annular axially extending body portion 141 as well as an outwardly extending lateral flange portion 142. Views of FIGURES 5 and 6 provide an enlarged detailed showing of differing sectional views of the dirt seal valve means 140 of FIGURE 4. The plastic valve means 140 has a generally L-shaped cross section similar to that described previously as well as a plurality of L-shaped inner recesses having an inner axial portion 143 as well as a radial portion 144. The outer periphery of the flange portion 142 terminates in an outer peripheral sealing edge 145 defined by a lower portion of a conical extension 145 of the flange along an under side of which there is a continuous annular groove 147 which intersects at predetermined intervals with radial outer ends of the radial portion 144 of the L-shaped inner recesses. The extension 146 terminates in an outer edge 148.

The provision of continuous annular groove 147 provides an interconnection of the radially outer ends of recess portions 144 and serves to increase flexibility and resilience of the extension 146 so as to facilitate lift-up or displacement thereof during injection of lubricant under pressure to the ball joint assembly which effects passage of dirty lubricant through the L-shaped inner recesses of static valve means 140 so as to permit escape of the used lubricant along an under side of the sealing edge 145. It is also noted that the dirt seal valve means 40 and 140 can be made of acetal resin as well as nylon or polyamide materials with the latter in some instances having greater flexibility. In either case, the reduced diameter end 34 of the boot member 31 will engage the dirt seal valve means along an outer peripheral surface thereof.

While the embodiments of the present invention constitute a preferred form, it is to be understood that other forms might be adopted.

What is claimed is as follows:

1. A ball joint assembly, comprising, a lubricant-receiving socket portion as well as a ball portion complementary thereto, a stud means projecting from said ball portion to be relatively movable as to said socket portion and attached to a structural member such as a vehicle steering knuckle, a dirt-shielding annular boot member of resilient material secured to said socket portion and having a bellows-like configuration extending to a thickened annular end, and an annular plastic valve portion separate from though fitted contiguous to said thickened annular end of said boot member as well as having inner passages therewith terminating short of an outer peripheral edge of said annular plastic valve portion that makes a static seal normally in engagement with said structural member yet displaceable to permit passage of lubricant under pressure, said thickened annular end of said boot member slidably engaging said separate plastic valve portion.

2. The assembly of claim 1 wherein said separate plastic valve portion has an L-shaped cross section and inner L-shaped recessing as said passages, said boot member at said thickened annular end thereof being in complementary biasing contact with an outer surface of said separate plastic valve portion.

3. In combination on a ball joint assembly having a lubricant receiving socket portion as well as a ball portion complementary thereto, a stud means carried by said ball portion and extending outwardly of said socket portion, a dirt-shielding boot member attached to said socket portion and having an annular bellows-like configuration with an annular end portion, and an annular plastic valve means having a body of general L-shaped cross section and a plurality of L-shaped inner recesses that terminate radially inwardly of an annular outer peripheral sealing edge of said body of said valve means which is press fitted along inner periphery thereof onto said stud means to be static therewith, said boot end portion engaging said valve means rotatably though sealingly along an outer periphery thereof while said L-shaped inner recesses provide axial and radially outer passage for lubricant under pressure temporarily to overcome static engagement of said peripheral edge against a structural mounting member.

4. The combination of claim 3 wherein said boot end portion has a reinforcement ring embedded therein in a specific location radially outwardly in concentric alignment with annular ribbing integral with a radially inner surfacing of said annular end portion for sealingly engaging the outer periphery of said valve means.

5. The combination of claim 3 wherein said body of said valve means includes a continuous annular groove located just radially inwardly along said annular outer peripheral sealing edge and extending all the way around to interconnect radially outer ends of said L-shaped inner recesses so as to maintain lubricant normally and positively radially inwardly of said outer peripheral sealing edge of said body of said valve means.

6. On a ball joint assembly having a lubricant receiving socket portion as well as a ball portion complementary thereto and a stud means secured to the ball portion, the combination therewith which comprises both a dirt-shielding boot member of resilient material attached to the socket portion and having an annular bellows-like configuration extending to a thickened annular end including seal ribbing along inner periphery thereof, and an annular plastic valve means separate from though fitted along outer periphery thereof into engagement with said inner seal ribbing of said annular end of said boot member, said separate valve means having a generally L-shaped cross section including an annular body portion extending axially of the stud means as well as an integral radially outwardly extending portion and including a plurality of L-shaped inner recesses that terminate purposely radially inwardly of an annular outer peripheral sealing edge of said radially outwardly extending portion and that provide axial and radially outer passage for lubricant under pressure temporarily to overcome normal positioning of said outer peripheral sealing edge statically against a structural member such as a vehicle steering knuckle to which the stud means is secured though said boot member is flexible and movable though in sealing engagement at all times at least against said axially extending body portion of said annular plastic valve means.

References Cited by the Examiner

UNITED STATES PATENTS

| 2,197,037 | 4/40 | Gardner. |
| 2,496,839 | 2/50 | Abramoska. |
| 2,559,857 | 7/51 | Edwards. |
| 2,942,902 | 6/60 | Rowland. |
| 3,024,050 | 3/62 | Moskovitz. |

FOREIGN PATENTS

| 1,152,205 | 9/57 | France. |

CARL W. TOMLIN, *Primary Examiner.*